(12) United States Patent
    Wilbur

(10) Patent No.: US 12,625,025 B2
(45) Date of Patent: May 12, 2026

(54) SENSOR SYSTEMS AND METHODS FOR REMOTELY MONITORING A FLUID PROPERTY

(71) Applicant: Ryan W. Wilbur, Fort Edward, NY (US)

(72) Inventor: Ryan W. Wilbur, Fort Edward, NY (US)

( * ) Notice: Subject to any disclaimer, the term of this patent is extended or adjusted under 35 U.S.C. 154(b) by 252 days.

(21) Appl. No.: 18/056,134

(22) Filed: Nov. 16, 2022

(65) Prior Publication Data

US 2024/0159612 A1    May 16, 2024

(51) Int. Cl.
    *G01L 19/08*       (2006.01)
    *G01L 19/12*       (2006.01)
    *G01L 19/14*       (2006.01)

(52) U.S. Cl.
    CPC ............ *G01L 19/086* (2013.01); *G01L 19/12* (2013.01); *G01L 19/14* (2013.01)

(58) Field of Classification Search
    CPC ........ G01L 19/086; G01L 19/12; G01L 19/14
    See application file for complete search history.

(56) References Cited

U.S. PATENT DOCUMENTS

| | | | |
|---|---|---|---|
| 6,795,319 B2 | 9/2004 | Preston et al. | |
| 6,967,571 B2 | 11/2005 | Tsujita | |
| 7,262,693 B2 | 8/2007 | Karschnia et al. | |
| 7,889,064 B2 | 2/2011 | Petrucelli | |
| 8,264,373 B2 | 9/2012 | Haegg | |
| 9,204,812 B2 | 12/2015 | Kassem | |
| 11,009,897 B2 | 5/2021 | Lauzon et al. | |
| 2004/0203421 A1 | 10/2004 | Hedtke | |
| 2015/0125839 A1 | 5/2015 | Tillges et al. | |
| 2022/0022426 A1* | 1/2022 | Berckmans | ............ A01K 29/00 |
| 2023/0184303 A1* | 6/2023 | Zeng | ................... F16D 65/0068 |
| | | | 188/26 |

(Continued)

FOREIGN PATENT DOCUMENTS

| | | |
|---|---|---|
| CN | 204649221 U | 9/2015 |
| CN | 105354932 A | 2/2016 |
| CN | 110177395 A | 8/2019 |

(Continued)

OTHER PUBLICATIONS

Phoenix Sensors PS6W-P2P Single Channel Wireless Receiver, 2.4Ghz-Module-1 Manual, 2 pp., 2017.

(Continued)

*Primary Examiner* — Xin Y Zhong
(74) *Attorney, Agent, or Firm* — Tech Valley Patent, LLC; John Pietrangelo

(57)    ABSTRACT

Sensor systems and methods for remotely and wirelessly monitoring fluid properties are provided. The systems and methods employ sensor systems with a first housing having a sensor and a transmitter and a second housing, detachable from the first housing, having a receiver and an indicator, such as, a display for the detected fluid property. The transmitter and receiver use radio waves to communicate electrical signals corresponding to the detected fluid property between remote locations. Aspects of the invention are uniquely adapted for safely remotely mentoring gas pressures from a remote location, but any fluid property may be remotely monitored using aspects of the invention.

24 Claims, 3 Drawing Sheets

(56)                    References Cited

U.S. PATENT DOCUMENTS

2024/0077376 A1 *   3/2024   Molinazzi ............... G01L 19/14

FOREIGN PATENT DOCUMENTS

| CN | 209802568 U | 12/2019 |
| CN | 107941391 B | 4/2020 |
| KR | 100760694 B1 | 9/2007 |
| KR | 101350964 B1 | 1/2014 |
| KR | 20150076908 A | 7/2015 |

OTHER PUBLICATIONS

Sensor One, IWR-5 Five Channel Wireless Receiver, SensorsONE Measurement Instrumentation Products, 1p., 2016.
Wireless Pressure Sensor, Wireless 2.4 GHz Pressure Sensor Transmitter with 4-20mA Output Receiver, Imagine Industrial Controls, undated. Retrieved From: https://imagineindustrialcontrols.com/products/wireless-pressure-sensor-transmitter-with-4-20ma-output-receiver.

* cited by examiner

SENSOR SYSTEMS AND METHODS FOR REMOTELY MONITORING A FLUID PROPERTY

BACKGROUND OF THE INVENTION

Technical Field

The present invention generally relates to remotely and wirelessly monitoring fluid properties, for example, gas properties. More particularly, the present invention relates to remotely and wirelessly monitoring a fluid property with a sensor system having detachable housings, a first housing having a sensor and a transmitter and a second housing, detachable from the first housing, having a receiver and a fluid property indicator. The second housing can be remotely located from the first housing to safety remotely monitor a fluid property, such as, a combustible gas pressure.

Description of Related Art

Many industries and applications employ sensing devices to monitor and regulate system parameters, for example, fluid properties, such as, fluid flow and fluid pressure. Though historically these monitoring systems have employed electromechanical sensors adapted to detect a fluid property and then transmit an electric signal corresponded to the detected property to a remote receiver, for example, with a 4-20 milliamp hardwired electrical signal to, for example, a remote monitoring station or control room. However, with the advent of wireless signal transmission, many electrical signals avoid the use of hardwiring and allow signals to be transmitted and received wirelessly.

The monitoring of a fluid property in an environment containing a combustible fluid, for example, propane or natural gas, requires that any sensing and signal transmission system strictly avoid the potential exposure of the combustible fluid to electric spark. Accordingly, care must be taken in the design and implementation of systems in such environments to prevent fluid ignition by electric spark.

Due to the limitations of existing sensing and electrical signal technology, the monitoring of a fluid property in one location, for example, with a gauge or meter, to another, remote location, especially, in environments having a combustible fluid, are typically limited and inconvenient. This is presently due to the concern for combustible fluid ignition and the inadequacies of existing communication methods. For example, typically, monitoring a fluid property between remote locations presently requires the locating of personnel on site at the location of the gauge or meter to visually monitor the fluid property detected. Then, with visual monitoring, somehow the observed fluid property is relayed to the remote location, for example, by vocal communication of (that is, yelling) the detected pressure from the site of the gauge or meter to the remote site. However, due to the typical noise of a work site and, for example, the inherent loud noise of gas flowing in a pipeline at high pressure, vocal communication, and even communication by radio or phone, can be difficult. The cost and disadvantages of such on-site, visual observation and communication to a remote location are apparent.

Though wireless signal transmission, for example, Bluetooth®-type wireless communication and Wi-Fi communication, are known, these modes of communication are inadequate for this application. For example, ultrahigh frequency (UHF) radio wave communication Bluetooth-type devices are limited in range to a maximum of about 33 feet.

Also, Wi-Fi, which adheres to the IEEE 802.11 standards, is known to exhibit relatively high signal absorption, for example, by walls and ceilings, and only works best for line-of-sight uses. Both Bluetooth and Wi-Fi technologies are inadequate for transmitting signals between remote locations, for example, locations over 50 feet apart and which may not be in a line-of-site.

Aspects of the present invention overcome the limitations and disadvantages of this and other prior art.

SUMMARY OF THE INVENTION

Embodiments of the present invention, in their myriad of aspects, provide improved sensing systems and methods that employ sensor systems with a first housing having a sensor for a fluid property, such as, gas pressure, and a transmitter, and a second housing, detachable from the first housing, having a receiver and an indicator, such as, a display for the detected gas pressure. The transmitter and receiver use radio waves to communicate electrical signals corresponding to the detected fluid property between remote locations. Aspects of the invention are uniquely adapted for safely and remotely mentoring gas pressures from a remote location, but any fluid property may be remotely monitored.

One embodiment of the invention is a sensor system for remotely monitoring a fluid property, the system comprising or including: a sensor adapted to detect a fluid property at a first location and generate an electrical signal corresponding to the detected fluid property, the sensor mounted in a first housing; a radio transmitter positioned in the first housing, the radio transmitter configured to receive the electrical signal from the sensor and transmit a radio signal corresponding to the received electrical signal; a radio signal receiver positioned in a second housing, the second housing detachably mounted to the first housing and transferrable to a second location, remote from the first location, the radio signal receiver configured to receive the radio signal transmitted by the radio transmitter when the radio signal receiver is positioned in the second location and generate an electrical signal; an indicator, such as, a display, positioned in the second housing, the indicator configured to receive the electrical signal from the radio signal receiver and generate a signal detectable at the second location. In one aspect, the fluid property detected may be fluid pressure, fluid temperature, fluid chemical concentration, or fluid humidity, among others.

In one aspect, the sensor system may further include a processor, for example, a microcontroller, positioned in the first housing. The processor in the first housing may be adapted to receive the electrical signal generated by the sensor and output a processed signal to the radio transmitter. In one aspect, the sensing system may further include a processor positioned in the second housing. The processor in the second housing may be adapted to receive the electrical signal generated by the radio receiver and output a processed signal to the indicator.

In one aspect, the indicator may be a visual indicium, such as, a digital display, or an audible indicium, such as, an alarm.

In one aspect, the radio transmitter of the sensor system may be adapted to transmit a radio signal and the radio receiver may be adapted to receive the transmitted radio signal over at least 50 feet, for example, at least 100 feet, or at least 200 feet, or at least 300 feet. In other words, in one aspect, the second location may be at least 50 feet from the first location, for example, at least 100 feet from the first location, or at least 200 feet from the first location, or at least 300 feet from the first location.

In one aspect, the radio transmitter of the sensor system is adapted to transmit a radio signal having a frequency of about 434 MHz (for example, for ITU Region 2), or at a frequency of about 915 MHz (for example, for ITU Region 1).

Another embodiment of the invention is a method for monitoring a fluid property, the method comprising or including: locating an assembly of a first housing having a fluid property sensor and a radio transmitter and a second housing having a radio receiver and an indicator in a first location, the second housing detachably mounted to the first housing; detaching the second housing having the radio receiver and the indicator from the first housing; positioning the second housing having the radio receiver and the indicator in a second location, remote from the first location; detecting a fluid property with the sensor in the first location; transmitting a radio signal corresponding to the detected fluid property from the radio transmitter in the first housing at the first location to the radio receiver in the second housing at the second location; emitting a detectable signal from the indicator in the second housing at the second location corresponding to the fluid property detected by the sensor in the first housing at the first location. The fluid property of the method may be fluid pressure, fluid temperature, fluid chemical concentration, or fluid humidity, among others.

In one aspect, the method further includes processing the electrical signal generated by the sensor with a processor and outputting a processed signal to the radio transmitter. In another aspect, the method further includes processing the electrical signal generated by the radio receiver to output a processed signal to the indicator.

In one aspect of the method, the emitting the detectable signal from the indicator may be practiced by displaying a signal corresponding to the fluid property detected by the sensor and/or activating an audible signal.

In one aspect of the method, the positioning the second housing in the second location, remote from the first location, may be practiced by positioning the second housing in a second location at least 50 feet away from the first location, or at least 100 feet away from the first location, or at least 200 feet away from the first location, or at least 300 feet away from the first location.

In one aspect of the method, transmitting the radio signal corresponding to the detected fluid property may be practiced by transmitting the radio signal corresponding to the detected fluid property at a frequency of about 434 MHz, or at a frequency of about 915 MHz.

In one aspect of the method, the fluid property may be a gas pressure, and emitting a detectable signal from the indicator may be practiced by displaying an indicium corresponding to the gas pressure, for example, a numerical display of gas pressure.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

Figure 1:
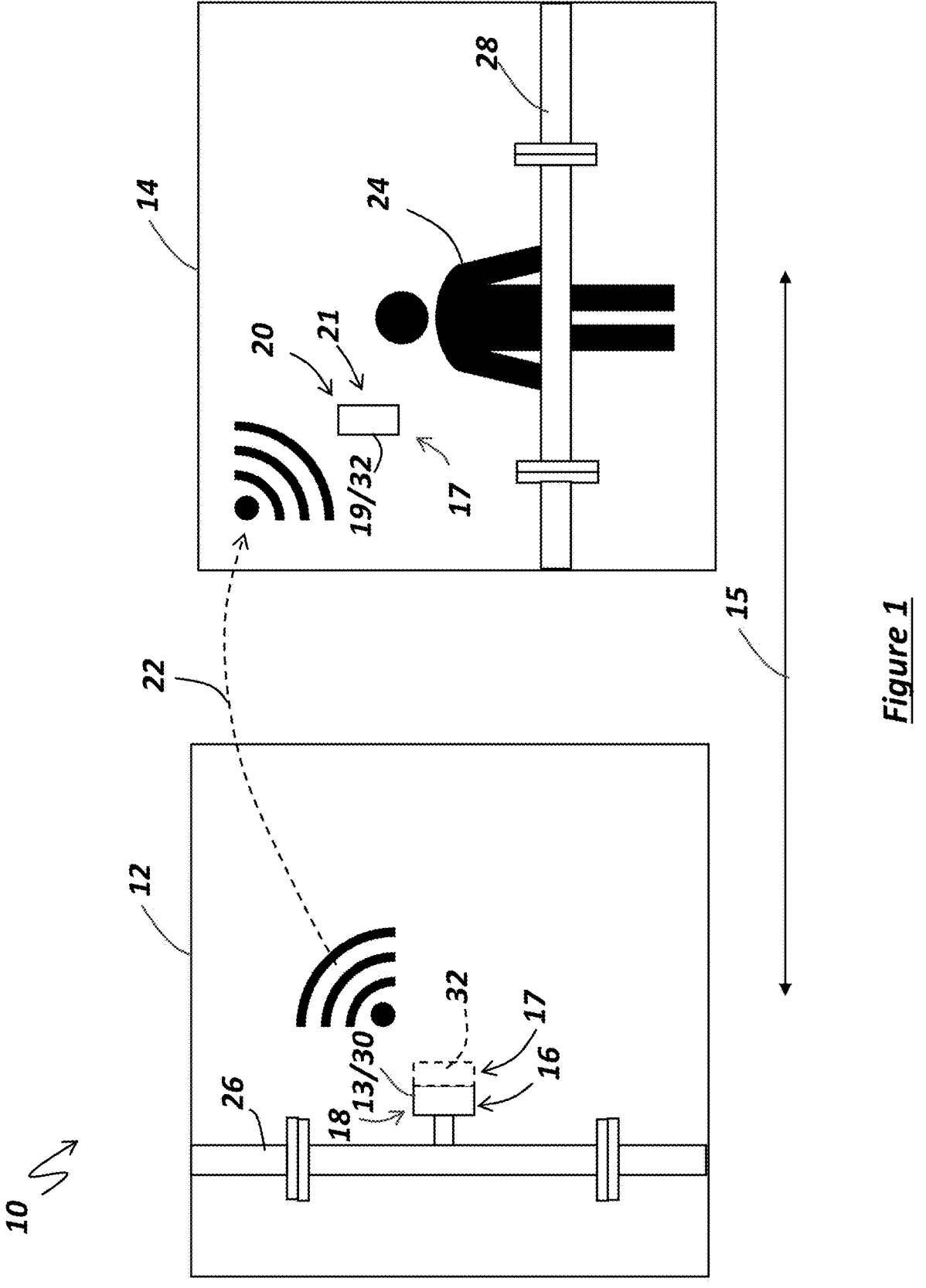
FIG. 1 is a schematic illustration of one environment for practicing aspects of the invention according to one embodiment.

FIG. 1 is a schematic illustration of one environment 10 for practicing aspects of the invention according to one embodiment. As shown in FIG. 1, the environment 10 may include a first location 12 and one or more second locations 14 remote from the first location 12, for example, at a distance 15. For example, second location 14 may be at distance 15 of least 50 feet from first location 12, but may typically be at least a distance 15 of at least 100 feet away from first location 12.

According to aspects of the invention, a sensor system 17 includes a sensor/transmitter 13 having one or more sensors 16 and one or more transmitters 18 and a receiver/indicator 19 having one or more receivers 20 and one or more indicators 21. The one or more sensors 16 are adapted to detect a fluid property and generate an electrical signal corresponding with the detected property. The transmitter 18 is configured to receive the electrical signal from the one or more sensors 16 and transmit one or more signals corresponding to the received electrical signals from the one or more sensors 16 corresponding to the detected fluid property.

The sensor/transmitter 13 having one or more sensors 16 and transmitter 18 may be located in the first location 12 and receiver/indicator 19 having receiver 20 and indicator 21 may be located in the second location 14, where the transmitter 18 and receiver 20 are in communication via electromagnetic signal 22, for example, a radio signal.

The one or more sensors 16 may typically be fluid property sensors, for example, adapted to detect one or more fluid properties, such as, fluid pressure, fluid temperature, fluid humidity, or fluid chemical concentration, among others. In one aspect, distance 15 may be the distance between the transmitter 18 and the receiver 20.

The receiver 20 is configured to receive the signal 22 transmitted by the transmitter 18 and generate an electrical signal corresponding to the received signal 22. The indicator 21 is configured to receive the electrical signal from the receiver 20 and generate a signal detectable at the second location. The indicator 21 may be a visual indicator, for example, a display showing a visual signal, and/or audible indicator, such as, an alarm emitting an audible signal, among other signals detectable at the second location.

According to aspects of the invention, having a remote receiver 20 and indicator 21 allows personnel 24, for example, one or more technicians, to be located in the second location 14 and monitor a fluid property, such as, a gas pressure, detected by sensor 16 in first location 12. For example, in one aspect, first location 12 and/or second location 14 may comprise harmful environments, for example, having a flammable or combustible fluid, such as, natural gas, and sensor 16 may be adapted to detect gas pressure in a pipe 26 containing the flammable or combustible fluid. One or more personal 24 in second location 14 may be servicing equipment, such as, pipe 28, in location 14 which may be in fluid communication with equipment, such as, pipe 26, in location 12 where the monitoring of the gas pressure in pipe 26 in location 12 can be critical to the safety of the personnel 24 in remote location 14 or to the equipment in remote location 14.

According to aspects of the invention, sensor system 17 includes sensor/transmitter 13 and receiver/indicator 19. Sensor/transmitter 13 includes a housing 30, for example, a first housing, and sensor 16 and transmitter 18 are positioned or mounted in housing 30 in location 12. Receiver/indicator 19 includes a housing 32, for example, a second housing, and receiver 20 and indicator 21 are positioned or mounted in housing 32 in remote location 14. In one aspect, second housing 32, which is shown in phantom in location 12 and in solid line in location 14 in FIG. 1, is mountable upon first housing 30, for example, releasably or detachably mountable to housing 30. In one aspect, housing 30 and housing 32 may be provided as an assembly of coupled housings, for example, in location 12, and housing 32 having receiver 20 may uncoupled from housing 30 and positioned in, for example, transferred to, remote location 14. According to aspects of the invention, the mounting or coupling of housing 32 to housing 30 may be practiced using mechanical fasteners, hook-and-loop-type fasteners (for example, Velcro® brand hook-and-loop-type fasteners), one or more magnets, a releasable adhesive, or one or more suction cups, among other coupling mechanisms or devices. In one aspect, the coupling mechanism between housing 32 and housing 30, for example, one or more magnets, may facilitate the mounting of housing 32 in remote location 14.

Figures 2, 3:
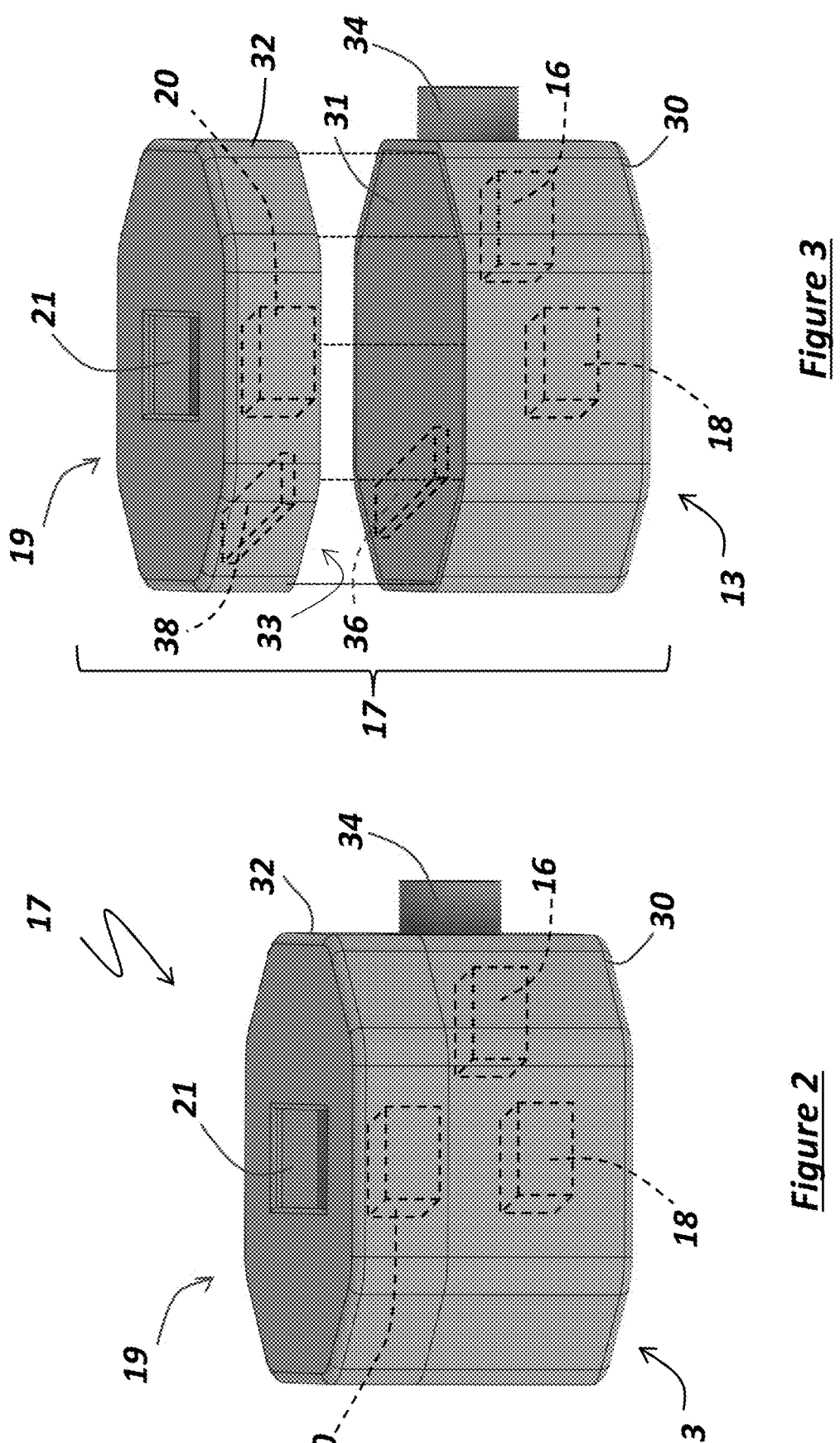
FIG. 2 is a perspective view of a sensor system that can be used in the environment shown in FIG. 1 according to an embodiment of the invention.
FIG. 3 is an exploded perspective view of the sensor system shown in FIG. 2.

FIG. 2 is a perspective view of a sensor system 17 shown in FIG. 1. As shown in FIG. 2, sensor/transmitter 13 of sensor system 17 includes housing 32, having receiver 20 and indicator 21, and housing 32 is shown coupled or mounted to housing 30, having one or more sensors 16 and transmitter 18. FIG. 3 is an exploded perspective view of the sensor system 17 shown in FIG. 2 with housing 32 of receiver/indicator 19 decoupled from housing 30 of sensor/transmitter 13 according to an aspect of the invention. As shown in FIGS. 2 and 3, housing 30 may include a removable cover 31 and housing 33 may include a removable cover 33. Housing 30 may include one or more openings or ports 34, for example, providing at least some fluid communication with the one or more sensors 16 in housing 30. For example, in one aspect, port 34 may be a threaded hole adapted to engage a pipe coupling or other pipe connector. Though in one aspect, housing 30 may include one or more sensors 16 and a transmitter 18, housing 30 may include other components and devices, including, but not limited to, a processor, a power supply, and one or more communication ports, such as, a USB port or a serial port (for example, to communication with external devices for uploading and downloading data and updating software/firmware). Similarly, though in one aspect, housing 32 may include a receiver 20 and an indicator 21, housing 32 may include other components and devices, including, but not limited to, a processor, a power supply, and one or more communication ports, such as, a USB port or a serial port.

According to one aspect, housings 30 and 32 may be coupled and decoupled by any one the mechanisms or devices disclosed herein. For example, as shown in FIGS. 2 and 3, housings 30 and 32 may each include one or more magnets or ferro-magnetic materials 36 and/or 38, respectively, that can be used to releasably couple housing 32 to housing 30. In one aspect, magnet 38 in housing 32 may facilitate the mounting of housing 32 in remote location 14, for example, to magnetically mount housing 32 on a ferromagnetic surface such as a ferromagnetic pipe or ferromagnetic cabinet or housing.

In one aspect, due to the potential of the presence of combustible gas in the environments of the first location 12 and/or the second location 14, housings 30 and 32 preferably are intrinsically safe. That is, in one aspect, housings 30 and 32 are fluid sealed to prevent any ambient gas or liquid from entering housings 30 and 32 and exposing the ambient fluids to electrical spark ignition from electrical components within housings 30 and 32. Accordingly, in one aspect, housings 30 and 32 are substantially completely fluid sealed, for example, in addition to lacking openings (except for port 34), cover 31 of housing 30 and cover 33 of housing 32 may include sealing devices, such as, gaskets, seals, or other sealants to substantially prevent ingress of fluid into housings 30 and 32. In one aspect, covers 31 and 32 may be omitted to avoid ingress of ambient fluids. In one aspect, housings 31 and 32 may be formed by "over-molding" about the components internal to housings 31 and 32, for example, encased in a plastic or elastomeric material, to minimize or prevent ingress of any flammable fluids.

In one aspect, as shown in FIGS. 2 and 3, housings 30 and 32 may comprise substantially identical cross-sectional shapes, for example, octagonal as shown. However, according to other aspects of the invention, housings 30 and 32 may not be substantially identical in cross-sectional shape, but the cross-sectional shapes of housings 30 and 32 may vary in cross-sectional shape. For example, housings 30 and 32 may be polygonal in cross-sectional shape, for example, square, rectangular, or hexagonal in cross-sectional shape; circular in cross-sectional shape; or elliptical (for example, oval) in cross sectional shape.

Housings 30 and 32 may be fabricated from any appropriate material, for example, a plastic, a metal, or a metal and plastic. In one aspect, when plastic, housings 30 and 32 may be fabricated from a polyamide (PA), for example, nylon; a polyethylene (PE), both high-density polyethylene (HDPE) and low-density polyethylene (LDPE); a polyethylene terephthalate (PET); a polypropylene (PP); a polyester (PE); a polytetrafluoroethylene (PTFE); a polystyrene (PS); an acrylonitrile butadiene styrene (ABS); a polycarbonate (PC); or a polyvinylchloride (PVC); among other plastics. In one aspect, when metallic, housings 30 and 32 be fabricated from steel, stainless steel, aluminum, titanium, or any other structural metal. When comprised of a metal and a plastic, one or more the above metals may be combined with any one or more of the above plastics in fabricating housings 30 and 32. In one aspect, housing 30 and/or 32 may be comprised of a reinforced plastic of any one of the plastics disclosed herein, for example, a nylon reinforced with carbon fibers, among other reinforcing materials.

Figures 4, 5:
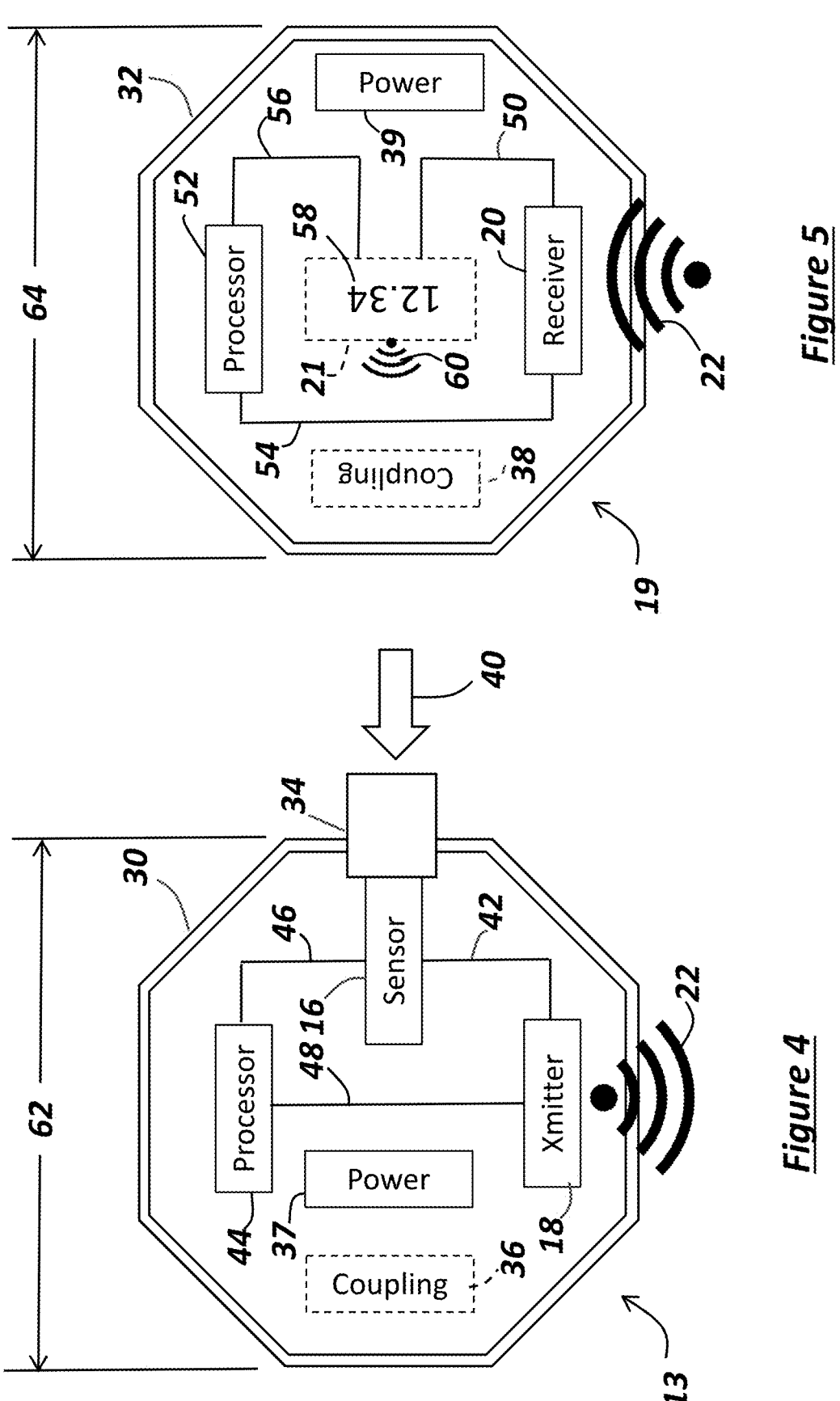
FIG. 4 is top plan view of one sensor/transmitter shown in FIG. 3, with cover removed, according to one aspect of the invention.
FIG. 5 is top plan view of one receiver/indicator shown in FIG. 3, with cover removed, according to one aspect of the invention.

FIG. 4 is top plan view of one sensor/transmitter 13 having housing 30 shown in FIG. 3, with cover 31 removed, revealing one or more sensors 16 and transmitter 18 according to one aspect of the invention. As shown in FIG. 4, port 34 may typically be in fluid communication with sensor 16, for example, in fluid communication with the sensing element of sensor 16, wherein a fluid property may be detected by exposing the access port 34 to a fluid, as indicated schematically by arrow 40. According to aspects of the invention, fluid 40 may be a liquid or a gas, and the fluid property may be a property of a liquid or a property of a gas. As disclosed herein, one or more sensors 16 are adapted to detect a fluid property and generate an electrical signal corresponding with the detected property. The generated electrical signal, for example, a 4-20 milliAmp [mA] signal may be directed to transmitter 18 via one or more electrical connections 42. As also disclosed herein, transmitter 18 is configured to receive the electrical signal from the one or more sensors 16, for example, received via one or more electrical connections 42, and transmit one or more signals 22 corresponding to the received electrical signals from the one or more sensors 16 corresponding to the detected fluid property. As shown in FIG. 4, housing 30 may include one or more processors 44, and, in one aspect, the electrical signal generated by one or more sensors 16 may be forwarded to one or more processors 44 via one or more electrical connections 46 for manipulation and/or processing, and then the manipulated and/or processed signal may be forwarded to transmitter 18, for example, via one or more electrical connections 48. As disclosed herein, transmitter 18 is configured to receive the electrical signal from the one or more sensors 16 and/or from the one or more processors 44 and transmit one or more signals 22 corresponding to the received electrical signals from the one or more sensors 16 corresponding to the detected fluid property. As discussed below, the one or more signals 22 transmitted by transmitter 18 are received by receiver 20 in remote receiver/indicator 19.

In one aspect, one or more sensors 16 may be any sensor adapted to detect a fluid property in the fluid 40 introduced, for example, via port 34. As disclosed herein, one or more sensors 16 may be adapted to detect fluid pressure, fluid temperature, fluid humidity, fluid chemical concentration, or fluid depth, among other fluid properties. In one aspect, sensor 16 may be a gas pressure sensor, for example, a gas pressure sensor provided by Amphenol Its, for instance, model 803313 pressure sensor or its equivalent. In other aspects, the one or more sensors 16 may be adapted to detect an electrical property, for example, a voltage, a current, or a resistance. In other aspects, the one or more sensors 16 may be adapted to detect elevation, for example, the difference in elevation of first location 12 and second location 14, or distance, for example, the distance between first location 12 and second location 14.

The transmitter 18 may be any transmitter, or one or more transmitters, adapted to receive electrical signals, for example, from one or more sensors 16 and/or from one or more processors 44, and transmit an electromagnetic signal 22. In one aspect of the invention, the signal 22 transmitted by transmitter 18 may be any electromagnetic signal, including a microwave signal or a radio wave signal. However, according to one aspect of the invention, the electromagnetic signal 22 may be one or more radio wave signals. For example, the signal 22 may be a radio wave signal adhering to Industry Scientific and Medical (ISM) frequency bands, for instance, having a frequency between 6 megahertz [MHz] and woo MHz. In one aspect, for example, when used in the western hemisphere (that is, in International Telecommunications Union (ITU) Region 2), the signal 22 may be radio wave signal having a frequency of about 434 MHz. In another aspect, for example, when used in the eastern hemisphere (that is, in ITU Region 1), the signal 22 may be radio wave signal having a frequency of about 915 MHz. In one aspect, transmitter 18 may be "packet radio" type radio transmitter, as known in the art, though other types of radio transmitters may be used. In one aspect, transmitter 18 may be an RFM69HCW packet ratio transmitter, or its equivalent. In another aspect, transmitter 18 may be a packet ratio transmitter provided by Embit S.R.L. of Modena, Italy, having the model number EMB-LR12765, or its equivalent.

According to aspects of the invention, radio wave signal 22 may be transmitted and received by an appropriate receiver for over 50 feet or for over 100 feet, but typically, over 200 feet, and even over 300 feet. For example, in contrast to aspects of the invention, ultrahigh frequency (UHF) radio waves (that is, from 2.402 gigahertz [GHz] to 2.48 GHz), for example, those transmitted by Bluetooth® devices, are limited to transmitting and receiving signals at less than 50 feet, for example, about 33 feet.

The one or more processors 44 in housing 30 may comprises one or more arithmetic processors or programmable logic controllers (PLC). In one aspect, one or more processors 44 may typically include programmable software, for example, Arduino software, or its equivalent. In one aspect, one or more processors 44 may include an Analog-to-Digital converter (ADC), for example, to convert the analog signal, for instance, a voltage, received from the sensor 16 to a digital signal output and readable by the user. In one aspect, the one or more processors 44 may modify or manipulate the digital signal produced by the ADC, for example, time averaging and data smoothing, among other data processing. The output from the one or more processors 44 may be forwarded to transmitter 18, for example, via one or more electrical connections 48. In one aspect, processor 44 may be a Programmable Intelligent Computer (PIC) microcontroller, for example, a PIC microcontroller provided by Microchip Technology of Chandler, Arizona, having the model number PIC18F45K42, or its equivalent.

As also shown in FIG. 4, housing 30 may include one or more coupling mechanisms or devices 36, for example, one or more magnets and/or ferro-magnetic materials. However, according to aspects of the invention, housing 30 may include any coupling device or mechanism adapted to permit coupling and decoupling of housing 32 from housing 30. According to aspects of the invention, the one or more coupling mechanisms or devices 36 may be mechanical fasteners, hook-and-loop-type fasteners, a detachable adhesive, one or more magnets or ferromagnetic materials, or one or more suction cups, among others.

As also shown in FIG. 4, housing 30 may include one or more power supplies 37 adapted to power the components of sensor/receiver 13. Power supply 37 may be internal or external batteries (for example, AA or AAA batteries) or an interface for an external power supply, such as, a power cord to the local electrical grid. In one aspect, power supply 37 may provide about 4.5 volts-DC (VDC). Though not shown in FIG. 4, power supply 37 may be operatively connected to the components of sensor/receiver 13 by conventional means, for example, electrical wiring.

FIG. 5 is bottom view of receiver/indicator 19 having housing 32 shown in FIG. 3, with cover 33 removed, revealing receiver 20 and indicator 21 according to one aspect of the invention. Since indicator 21 may typically be located on the opposite side of housing 32, indicator 21 is shown in phantom in FIG. 5. As disclosed herein, receiver 20 is configured to receive the electrical signal 22 from transmitter 18 in housing 30, for example, a 434 MHz radio signal and/or about 915 MHz, and generate and transmit a corresponding electrical signal to indicator 21 to, for example, display. The signal transmitted by receiver 20 may be transmitted to indicator 21 via one or more electrical connections 50. As shown in FIG. 5, receiver/indicator 19 may include one or more processors 52, and, in one aspect, the electrical signal generated by receiver 20 may be forwarded to one or more processors 52 via one or more electrical connections 54 for manipulation and/or processing, and then the manipulated and/or processed signal may be forwarded to indicator 21, for example, via one or more electrical connections 56. In one aspect, the one or more processors 52 in receiver/indicator 19 may control the operation of receiver 20, for example, forwarding instructions to receiver 20 to receive signals from transmitter 18, among other instructions. The one or more processors 52 may control the output to indicator 21, for example, the format or timing of the display, among other instructions. In one aspect, the one or more processors 52 may direct receiver 20 to communicate with transmitter 18 in sensor/transmitter 13, for example, to send data or instructions back to transmitter 18 and/or to processor 44. For instance, in one aspect, one or more processors 52 through receiver 20 may vary the operation of processor 44 and/or vary the operation of sensors 16, for instance, to vary the units of the signals being processed and forwarded to receiver 20 by transmitter 18, among other functions.

The receiver 20 may be any receiver, or one or more receivers, adapted to receive an electromagnetic signal 22, for example, from one or more transmitters 18, and transmit an electromagnetic signal to indicator 21 and/or processor 52. In one aspect of the invention, the signal 22 transmitted by transmitter 218 may be any electromagnetic signal, including a microwave signal or a radio wave signal. However, as disclosed herein, according to one aspect of the invention, the electromagnetic signal 22 may comprise one or more radio wave signals, for example, having a wavelength between 6 MHz and woo MHz. For example, the signal 22 may be a radio wave signal having a frequency of about 434 MHz (ITU 2) or a frequency of about 915 MHz (ITU 1). In one aspect, receiver 20 may be an RFM69HCW radio transceiver, for example, a radio transceiver provided by HOPERF of Shenzhen, China, or its equivalent.

The one or more processors 52 in receiver/indicator 19 may comprise one or more arithmetic processors or programmable logic controllers (PLC). In one aspect, the one or more processors 52 may typically include programmable software, for example, Arduino software, or its equivalent. In one aspect, one or more processors 52 may include an ADC, for example, to convert the analog signal, for instance, a voltage, received from the receiver 20 to a digital signal output and readable by the user. In one aspect, the one or more processors 52 may modify or manipulate the digital signal produced by the ADC, for example, time averaging and data smoothing, among other data processing. The output from the one or more processors 52 may be forwarded to indicator 21, for example, via one or more electrical connections 56. In one aspect, processor 52 may be a Atmel microcontroller, for example, a microcontroller provided by Microchip Technology, for example, a microcontroller having the model number ATMEGA328P, or its equivalent.

The indicator 21 in receiver/indicator 19 may be any indicator, or one or more indicators, adapted to receive an electromagnetic signal, for example, from one or more receivers 20 and/or one or more processors 52, and generate a visual indicium 58 and/or audible indicium 60 detectable by, for example, a nearby technician. In one aspect, indicator 21 may provide a visual indicium 58, for example, a digital display, corresponding to the fluid property detected by the one or more sensors 16 by sensor/transmitter 13. For example, the visual indicium 58 may be a digital or analog display of a fluid temperature detected by sensor 16.

In another aspect, the indicium 58 may emit a light or colored light (for example, from one or more LEDs) indicating the relative fluid property detected by sensor 16. For example, in one aspect, indicium 58 may emit a green light for a nominal fluid property within a previously defined range, a yellow light for an elevated fluid property in a previously-defined range, and a red light for a fluid property exceeding a previously defined fluid property limit. In another aspect, the indicium 58 may be a colored display indicating the relative fluid property detected by sensor 16, for example, a green display for a nominal fluid property within a previously defined range, a yellow display for an elevated fluid property in a previously-defined range, and a red display for a fluid property exceeding a previously defined fluid property limit. In one aspect, one or more digital or analog displays, light displays, or color displays may be provided.

In another aspect, with or without the use of a visual indicium 58, indicator 21 may include an audible indicium 60, for example, a sound, a tone, a siren, or an alarm. For example, in one aspect, indicator 21 may emit an audible tone or a repeated tone when a nominal fluid property within a previously defined range is detected by one or more sensors 16 in housing 30. In another aspect, the audible indicium 60 generated by indicator 21 may be no audible indicium 60 for a nominal fluid property within a previously defined range, an audible tone, for example, a different audible tone, for an elevated fluid property in a previously-defined range, and an alarm for a fluid property exceeding a previously defined fluid property limit.

In one aspect, indicator 21 may be an LCD display, for example, an LCD display provided by Tinsharp Industrial Co. Ltd. of Guang Zhou, China having the model number TC1602A-09T, or its equivalent.

As also shown in FIG. 5, receiver/indicator 19 may include one or more coupling mechanisms or devices 38, for example, one or more magnets and/or ferro-magnetic materials. Coupling mechanism or device 38 may typically be compatible with the corresponding coupling mechanism or device 36 of sensor/transmitter 13. However, according to aspects of the invention, housing 32 of receiver/indicator 19 may include any coupling device or mechanism adapted to permit coupling and decoupling of housing 32 from housing 30. According to aspects of the invention, the one or more coupling mechanisms or devices 38 may be mechanical fasteners, hook-and-loop-type fasteners, one or more magnets and/or ferro-magnetic materials, a detachable adhesive, or one or more suction cups, among others.

As also shown in FIG. 5, housing 32 may include one or more power supplies 39 adapted to power the components of receiver/indicator 19. Power supply 39 may be internal or external batteries (for example, AA or AAA batteries) or an interface for an external power supply, such as, a power cord to the local electrical grid. In one aspect, power supply 39 may provide about 4.5 volts-DC (VDC). Though not shown in FIG. 5, power supply 39 may be operatively connected to the components of receiver/indicator 19 by conventional means, for example, electrical wiring.

As shown in FIGS. 4 and 5, housings 30 and 32 may have substantially the same cross-sectional shape, for example, octagonal, as shown, and the same relative dimensions. However, in one aspect, the shape and dimensions of housings 30 and 32 may vary, for example, housing 30 may be rectangular or square in cross section and housing 32 may be circular or elliptical in cross section, among other shapes.

As shown in FIGS. 4 and 5, housing 30 may have an outside dimension 62 and housing 32 may have an outside dimension 64. Outside dimensions 62 and 64 may be similar or may vary. In one aspect, outside dimensions 62 and 64 may be range from 0.5 inches to 1 foot, depending, among other things, upon the environments and accessibility of locations 12 and 14. However, typically, outside dimensions 62 and 64 may range from 2 inches to 6 inches, for example, 4.5 inches.

In order to illustrate aspects of the invention and distinguish aspects of the invention from the prior art, the following illustration of one method for implementing aspects of the invention is provided.

Typically, when technicians and/or mechanics are working in potentially dangerous environments, for example, when servicing or inspecting natural gas or propane gas pipeline installations, it can be extremely important that the conditions in isolated remote locations be monitored. For example, in one application of aspects of the invention, when technicians are working at one location, for example, a second location 14, on a pipeline operatively connected to a pipeline in a remote location, or first location 12, it is often imperative that a technician be located in the remote first location 12 to monitor the gas pressure in the pipeline at the first location 12, for example, as indicated on a pressure gage mounted to the pipeline. Should the pressure in the gas pipeline vary or exceed a predetermined limit, the technician in the first location 12 can then advise technicians in the remote second location 14 of the change in gas pressure. However, such a scenario is undesirable, since it requires that personnel be present at the first location 12 and visually monitor the gas pressure, for example, on a gas gauge, and then report variations in the gas pressure to personnel at the second, remote location 14.

Typically, the second location 14 may be over 100 feet from the first location 12 and the second location 14 may typically not be within sight of the first location 12. For example, the second location 14 may be in a separate building and be over 300 feet away from the first location 12. Due to its limited range, Blue-tooth type communication is insufficient for communicating between first location 12 and second location 14. In addition, the typical combustible gas environment of both the first location 12 and the second location 14 limits the use of any electrical devices that could spark and potentially cause gas ignition. Therefore, aspects of the present invention employ intrinsically safe, fluid-tight housings 30 and 32 that are uniquely adapted to monitoring such combustible gas environments.

According to aspects of the invention, in order to monitor a fluid property in such remote, combustible gas environments, the sensor system 17 disclosed herein may be used. For example, first, the sensor assembly 17 with the sensor/transmitter 13 having one or more sensors 16 and the transmitter 18 and receiver/indicator 19, having detachable second housing 32, the receiver 20, and the indicator 21, may be located in the first location 12, for example, the basement of gas-powered building. Then, the first housing 30 of sensor/transmitter 13 is mounted to the desired conduit having the gas to be monitored, for example, via a pipe coupling mounted to a gas-containing pipeline, via port 34 of housing 30. Before or after mounting first housing 30, the second housing 32 of receiver/indicator 19 is detached from the first housing 30, for example, by disengaging mechanical fasteners or disengaging the one or more corresponding magnets and/or ferromagnetic materials. The second housing 32 of receiver/indicator 19 having the radio receiver 20 and the indicator 21 may then be positioned in the second location 14, for example, hand-carried by a technician to the second location 14, remote from the first location 12 at a distance 15, for example, a remote building or construction site. In one aspect, two or more housings 32 having a receiver 20 compatible with transmitter 18 and an indicator 21 may be used and located in two or more second, remote locations 14. In one aspect, the second housing 32 may be mounted in the second location 14 for viewing by personnel in the second location 14, for example, mounted on a ferromagnetic pipe or other ferromagnetic structure by the one or more magnets in second housing 32.

With the one or more second housings 32 of receiver/indicator 19 located in the one or more locations second location 14, the one or more sensors 16 in housing 30 in first location 12 can be used to detect the intended fluid property, such as, the gas pressure in the pipeline, in first location 12. The detected fluid property is then transmitted by radio waves 22 from transmitter 18 in housing 30 from first location 12 to one or more receiver/indicator 19 in second remote locations 14, for example, over 300 feet away and within a separate building. At remote second location 14, the transmitted signal 22 is received by receiver 20 of receiver/indicator 19 and a corresponding indicium 58 and/or 60 is generated by indicator 21 of receiver/indicator 19. The indicium 58 and/or 60 in the second location 14 can be viewed and/or heard by personnel in second location 14 and appropriate action taken, for example, initiating or terminating the servicing of the combustible gas pipeline in second location 12, for instance, without concern for being exposed to or igniting a combustible gas in second location 14.

When employing aspects of the invention, no personnel need be located in first location 12 to monitor a gas gauge, thus limiting manpower and time. In addition, the potential for undesirably igniting combustible gas in the first location 12 or in the second location 14 may be reduced or substantially eliminated.

As disclosed herein, sensor systems for monitoring remote fluid conditions and methods for monitoring fluid conditions in a remote location are provided. The systems and methods disclosed herein overcome the limitations and disadvantages of the prior art by providing detachable housings that allow the positioning of one sensor/transmitter housing in one location and the positioning of a second receiver/indicator housing at a second, remote location. The capability of providing detachable housings can help ensure that, among other things, the components provided may be inherently compatible, for example, having compatible transmission and receiving signal frequencies, and can reduce the manpower requirements required by existing systems and methods.

The terminology used herein is for the purpose of describing particular embodiments only and is not intended to be limiting of the disclosure. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A sensor system for remotely monitoring a fluid property, the system comprising:

a sensor adapted to detect a fluid property of a fluid in a first pipeline at a first location and generate an electrical signal corresponding to the detected fluid property, the sensor mounted in a first housing;

a radio transmitter positioned in the first housing, the radio transmitter configured to receive the electrical signal from the sensor and transmit a radio signal corresponding to the received electrical signal;

a radio signal receiver positioned in a second housing, the second housing detachably mounted to the first housing and transferrable to a second location, remote from the first location, having a second pipeline in fluid communication with the first pipeline, the radio signal receiver configured to receive the radio signal transmitted by the radio transmitter when the radio signal receiver is positioned in the second location and generate an electrical signal; and an indicator positioned in the second housing, the indicator configured to receive the electrical signal from the radio signal receiver and generate a signal detectable at the second location.

2. The sensor system as recited in claim 1, wherein the fluid property comprises at least one of fluid pressure, fluid temperature, fluid chemical concentration, and fluid humidity.

3. The sensor system as recited in claim 1, wherein the system further comprises a processor positioned in the first housing, the processor adapted to receive the electrical signal generated by the sensor and output a processed signal to the radio transmitter.

4. The sensor system as recited in claim 1, wherein the system further comprises a processor positioned in the second housing, the processor adapted to receive the electrical signal generated by the radio receiver and output a processed signal to the indicator.

5. The sensor system as recited in claim 1, wherein the indicator comprises at least one of a visual indicium and an audible indicium.

6. The sensor system as recited in claim 5, wherein the visual indicium comprises a display and the audible indicium comprises a sound.

7. The sensor system as recited in claim 1, wherein the radio transmitter is adapted to transmit a radio signal and the radio receiver is adapted to receive the radio signal at the second location at least 100 feet away from the first location.

8. The sensor system as recited in claim 1, wherein the second location is at least 100 feet from the first location.

9. The sensor system as recited in claim 8, wherein the second location is at least 200 feet from the first location.

10. The sensor system as recited in claim 1, wherein the first housing is detachably mountable to the first pipeline.

11. The sensor system as recited in claim 10, wherein the first housing comprises a sensing port that is detachably mountable to the first pipeline.

12. The sensor system as recited in claim 1, wherein the radio transmitter comprises an RFM69HCW radio transmitter.

13. The sensor system as recited in claim 1, wherein the second housing is mountable to a structure at the second location.

14. A method for monitoring a fluid property, the method comprising:

locating an assembly of a first housing having a fluid property sensor and a radio transmitter and a second housing having a radio receiver and an indicator on a first pipeline having a fluid in a first location, the second housing detachably mounted to the first housing;

detaching the second housing having the radio receiver and the indicator from the first housing;

positioning the second housing having the radio receiver and the indicator in a second location, remote from the first location, having a second pipeline in fluid communication with the first pipeline;

detecting a fluid property with the sensor at the first location;

transmitting a radio signal corresponding to the detected fluid property from the radio transmitter in the first housing at the first location to the radio receiver in the second housing at the second location;

emitting a detectable signal from the indicator in the second housing at the second location corresponding to the fluid property detected by the sensor in the first housing at the first location.

15. The method as recited in claim 14, wherein the fluid property comprises at least one of fluid pressure, fluid temperature, fluid chemical concentration, and fluid humidity.

16. The method as recited in claim 14, wherein the method further comprises processing the electrical signal generated by the sensor with a processor and outputting a processed signal to the radio transmitter.

17. The method as recited in claim 14, wherein the method further comprises processing the electrical signal generated by the radio receiver to output a processed signal to the indicator.

18. The method as recited in claim 14, wherein emitting the detectable signal from the indicator comprises at least one of displaying a signal corresponding to the fluid property detected by the sensor and activating an audible signal.

19. The method as recited in claim 14, wherein positioning the second housing in the second location, remote from the first location, comprises positioning the second housing in a second location at least 100 feet away from the first location.

20. The method as recited in claim 14, wherein the fluid property comprises gas pressure, and wherein emitting a detectable signal from the indicator comprises a displaying an indicium corresponding to gas pressure.

21. The method as recited in claim 14, wherein the first housing is detachably mountable to the first pipeline, and wherein locating the assembly having the first housing on the first pipeline comprises mounting the first housing to the first pipeline.

22. The method as recited in claim 14, wherein transmitting the radio signal comprises transmitting an RFM69HCW radio signal.

23. The method as recited in claim 14, wherein positioning the second housing in the second location comprises mounting the second housing to a structure in the second location.

24. The method as recited in claim 14, wherein locating the assembly on the first pipeline in the first location comprises mounting the assembly to a pipe coupling mounted to the first pipeline.

* * * * *